UNITED STATES PATENT OFFICE.

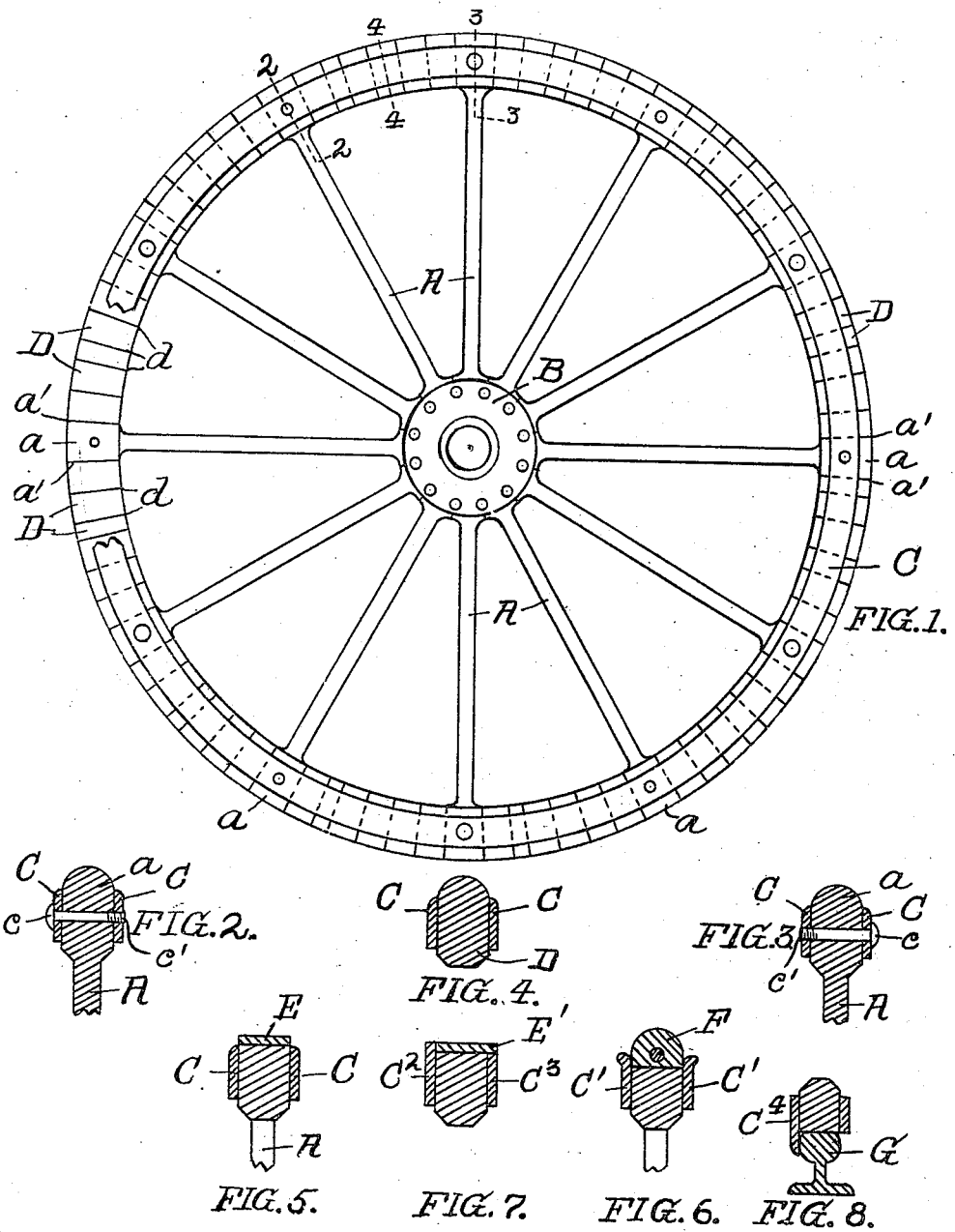

ALPHEUS FAY, OF LOUISVILLE, KENTUCKY.

VEHICLE-WHEEL.

No. 843,738.

Specification of Letters Patent.

Patented Feb. 12, 1907.

Application filed August 26, 1905. Serial No. 275,935.

*To all whom it may concern:*

Be it known that I, ALPHEUS FAY, a citizen of the United States, residing at Louisville, in the county of Jefferson and State of Kentucky, have invented certain new and useful Improvements in Vehicle-Wheels, of which the following to a specification.

The object of my invention is to provide an improved vehicle-wheel of cheap and durable construction, easy and noiseless in running; and my invention consists of the combination and arrangement of parts hereinafter described and claimed.

In the drawings, Figure 1 is an elevation, partly broken away, of a wheel embodying my invention; Fig. 2, an enlarged section on line 2 2 of Fig. 1; Fig. 3, an enlarged section on line 3 3 of Fig. 1; Fig. 4, an enlarged section on line 4 4 of Fig. 1 and Figs. 5, 6, 7, and 8 sections of modified forms of wheel-rims.

The wooden spokes A of the wheel are fitted into hub B in the usual manner. At their outer ends the spokes are provided with enlarged heads $a$, having their sides $a'$ cut on radial planes of the wheel, so as to give them a slight wedge shape. Iron bands C are secured to heads $a$ by means of screw-bolts $c$ and form spaces or channels between heads $a$. Bolts $c$ are preferably set in bands C with their heads on alternate sides and having their screw-threaded ends $c'$ flattened or spread over the outer surfaces of bands C, so as to form a secure fastening. The spaces or channels between heads $a$ are filled in by wooden blocks D, whose sides $d$ are also cut on radial planes, so as to give them a slight wedge shape. The outer ends of heads $a$ and blocks D form the bearing-surface of the wheel. The blocks D and heads $a$ have the grain running toward the center of the wheel, so that the wear is all on the ends of the grain. For convenience in construction it is recommended that blocks D be driven to position and the outer and inner surfaces of the rim thus formed be trimmed up afterward. By this construction it will be noted that blocks D and spoke-heads $a$ form, in effect, a continuous arch of strong and durable construction and that the contact with the street or road will be practically noiseless. Owing to the fact that blocks D are unsupported on their inner ends, they are free to move inwardly to retighten the arch should the arch become loosened by shrinkage of the blocks. If desired, bolts may be passed through blocks C; but it is not thought that this will usually be found necessary, as the blocks are tightly wedged in position by the driving and the pressure on the ground.

In Figs. 5, 6, and 7 I have illustrated modified forms of wheel-rims in which the same general construction of spoke-heads and blocks are preserved, but different forms of tires are used. In Fig. 5 I have illustrated the spoke-heads and blocks as trimmed down flush with the bands C and an iron tire E set around the circumference of the wheel. This construction retains the advantage of the arched rim, but of course is more liable to make a noise in running, owing to the use of the iron tire. In Fig. 6 I have shown a construction for mounting a rubber tire F. Here the bands C' are slightly flared at their outer ends and the spoke-heads and blocks trimmed to form a channel for the reception of the rubber tire. This construction also retains the arched rim, and, in addition, is noiseless in running. In Fig. 7 I have shown another construction for utilizing an iron tire. Here one band $C^2$ is slightly extended and iron tire E' set within it and over the other band $C^3$. In Fig. 8 I have illustrated a form of wheel-rim adapted to use on street-cars. Here one band $C^4$ is extended to form the wheel-flange and the spoke-heads and blocks run on rail G.

It is obvious that my improved construction is capable of use on all automobiles, cars, or other vehicle-wheels; but it is thought that it will be found to be especially applicable to heavy wheels.

While I have shown and described the preferred means for carrying my invention into effect, this is capable of variation without departing from the spirit of the invention. I therefore do not wish to be limited to the exact construction set forth; but

What I claim as new, and desire to secure by Letters Patent, is—

1. In a vehicle-wheel, the combination of spokes having heads extending to the rim-periphery and wedge-shaped blocks, having their grain in the lines of the radii of the wheel, set between said spoke-heads to complete the wheel-rim, substantially as specified.

2. In a vehicle-wheel, the combination of spokes having heads extending to the rim-periphery; wedge-shaped blocks, having their grain in the lines of the radii of the wheel, set between said spoke-heads to complete the wheel-rim; and metallic bands secured to said spoke-heads and adapted to hold the wedge-shaped blocks against lateral displacement, substantially as specified.

ALPHEUS FAY.

Witnesses:
 AGNES B. GRANT,
 BRAYTON G. RICHARDS.